(12) United States Patent
Wang et al.

(10) Patent No.: US 8,411,980 B1
(45) Date of Patent: Apr. 2, 2013

(54) REMOVING MOTION BLUR FROM UNALIGNED MULTIPLE BLURRED IMAGES

(75) Inventors: Jue Wang, Kenmore, WA (US);
Sunghyun Cho, Pohang (KR);
Seungyong Lee, Pohang (KR)

(73) Assignee: Adobe Systems Incorporated, San Jose, CA (US)

( * ) Notice: Subject to any disclaimer, the term of this patent is extended or adjusted under 35 U.S.C. 154(b) by 117 days.

(21) Appl. No.: 13/034,461

(22) Filed: Feb. 24, 2011

Related U.S. Application Data

(60) Provisional application No. 61/413,346, filed on Nov. 12, 2010.

(51) Int. Cl.
*G06K 9/48* (2006.01)
*G06K 9/40* (2006.01)
*H04N 5/228* (2006.01)
*H04N 9/74* (2006.01)

(52) U.S. Cl. ..... 382/254; 382/199; 382/260; 248/208.5; 248/581

(58) Field of Classification Search .......... 382/260–269, 382/199, 274, 254–255, 128–132, 240, 162, 382/167, 298–300; 348/208.4–208.6, 208.99, 348/218.1, 246, 252, 584, 294, 242; 358/3.06, 358/3.26–3.27
See application file for complete search history.

(56) References Cited

U.S. PATENT DOCUMENTS

| | | | |
|---|---|---|---|
| 7,548,659 B2 * | 6/2009 | Ofek et al. | 382/254 |
| 8,139,886 B2 * | 3/2012 | Szeliski et al. | 382/260 |
| 2005/0057687 A1 * | 3/2005 | Irani et al. | 348/443 |
| 2009/0316995 A1 * | 12/2009 | Szeliski et al. | 382/199 |
| 2011/0109755 A1 * | 5/2011 | Joshi et al. | 348/208.5 |
| 2011/0304687 A1 * | 12/2011 | Joshi et al. | 348/36 |

OTHER PUBLICATIONS

D. Krishnan, R. Fergus. Fast Image Deconvolution using Hyper-Laplacian Priors . Neural Information Processing Systems 2009.*
Whyte, O.; Sivic, J.; Zisserman, A.; Ponce, J.; , "Non-uniform deblurring for shaken images," Computer Vision and Pattern Recognition (CVPR), 2010 IEEE Conference on , vol., no., pp. 491-498, Jun. 13-18, 2010.*
Sroubek, F.; Flusser, J.; Sorel, M.; , "Superresolution and blind deconvolution of video," Pattern Recognition, 2008. ICPR 2008. 19th International Conference on , vol., no., pp. 1-4, Dec. 8-11, 2008.*
S. Baker and I. Matthews. Lucas-kanade 20 years on: A unifying frame-work. International Journal of Computer Vision (IJCV), 56(3):221-255, 2004.
Sunghyun Cho and Seungyong Lee. Fast motion deblurring. ACM Trans. Graphics, 28(5):article No. 145, 2009.
Anat Levin, Rob Fergus, Fredo Durand, and William T. Freeman. Image and depth from a conventional camera with a coded aperture. ACM Trans. Graphics, 26(3):article No. 70, 2007.

(Continued)

*Primary Examiner* — Andrae S Allison
(74) *Attorney, Agent, or Firm* — Wolfe-SBMC

(57) ABSTRACT

Various embodiments of methods and apparatus for removing motion blur are disclosed. A homography is estimated for each of a plurality of images. Two or more images of the plurality are unaligned. An estimated latent image for the plurality of images selected for recovery of the latent image is deconvolved. A point spread function for the each of the plurality of images is calculated. The homography for the each of the plurality of images, the estimated latent image, and the point spread function for the each of the plurality of images are iteratively updated until the homography for each of the plurality of images stabilizes. The iteratively updating includes updating one of the homography for the each of the plurality of images, the estimated latent image, and the point spread function for the each of the plurality of images while holding the remainder constant.

20 Claims, 10 Drawing Sheets

OTHER PUBLICATIONS

Stanley Osher and Leonid I. Rudin. Feature-oriented image enhancement using shock filters. SIAM Journal on Numerical Analysis, 27(4):919-940, 1990.

C. Tomasi and R. Manduchi. Bilateral filtering for gray and color images. In Proc. ICCV 1998, pp. 839-846, 1998.

* cited by examiner

REMOVING MOTION BLUR FROM UNALIGNED MULTIPLE BLURRED IMAGES

This application claims benefit of priority to U.S. Application Ser. No. 61/413,346, which was filed on Nov. 12, 2010.

BACKGROUND

Description of the Related Art

The recent profusion of inexpensive digital cameras has enabled the creation of a much broader universe of digital image content. New market entrants are now able to bring image capture to environments and events for which such image capture was previously considered cost prohibitive or technically unfeasible. In the past few decades, cameras have become smaller and more robust, and therefore portable to environments where photography was previously considered to be extremely difficult due to either the harshness of the environment or the inconvenience of introducing the camera equipment form factor into the space where the camera was desired.

Modern digital cameras are also able to capture more images to smaller media and remain in service for a greater number of exposures, thereby increasing the desirability of a camera in situations where cameras were not worth the inconvenience. Further, advances in the material design of camera cases have created a generation of cameras that may be used in harsh environments, such as extreme temperature or exposure to moisture. Many of the environments and events to which cameras are now introduced are highly dynamic, in terms of camera motion, and lead to the creation of images with cameras that are being moved during image capture with motion patterns that are not easily predicted or arranged in advance.

Unfortunately, a frequent result of a moving camera is an output image that is randomly blurred or otherwise distorted. Image deblurring is the process of recovering a sharp image with reduced motion blur or other distortion. A number of real-world problems from astronomy to consumer imaging reflect demand for improvements in the ability to deblur an image or set of images to discover latent image details.

SUMMARY

Various embodiments of methods and apparatus for removing motion blur are disclosed. A homography is estimated for each of a plurality of images. Two or more images of the plurality are unaligned. An estimated latent image for the plurality of images selected for recovery of the latent image is deconvolved. A point spread function for the each of the plurality of images is calculated. The homography for the each of the plurality of images, the estimated latent image, and the point spread function for the each of the plurality of images are iteratively updated until the homography for each of the plurality of images stabilizes. The iteratively updating includes updating one of the homography for the each of the plurality of images, the estimated latent image, and the point spread function for the each of the plurality of images while holding the remainder constant.

Figure 1:
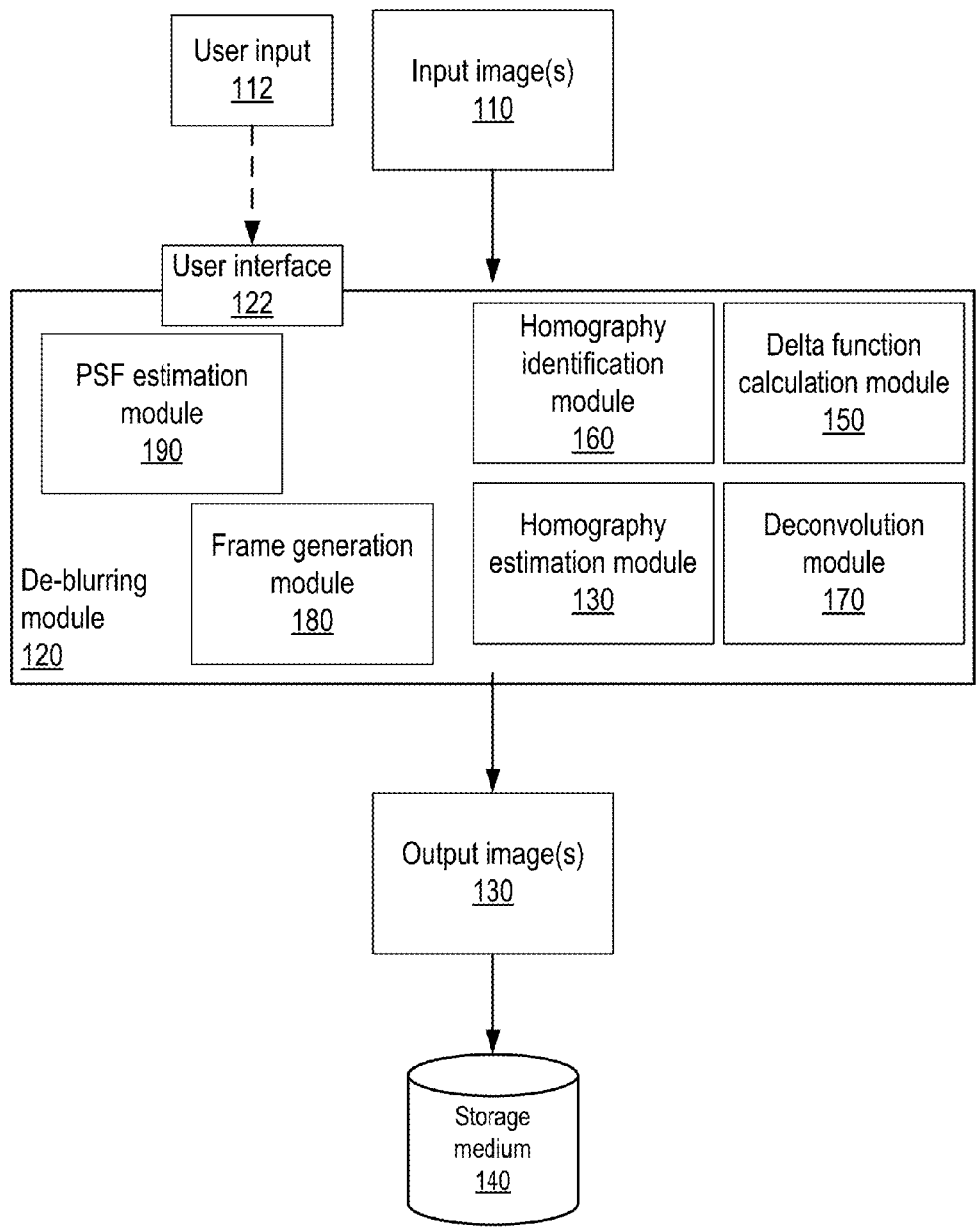
FIG. 1 depicts a module that may implement deblurring of images according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction to Deblurring of Images Using Iterative Estimation

Embodiments of an automated procedure for removing motion blur from images captured, such as those captured by cameras that are vibrating at the time of image capture, are disclosed. A pair or more of unaligned blurry images are identified and selected for recovery of a latent (reduced-blur) image. While the embodiments described below are explained with reference to only a pair of images, one of skill in the art will readily understand in light of having read the present disclosure that the techniques described below are applicable to extracting a latent image from an input image plurality of arbitrary size without departing from the scope and intent of the embodiments described below.

A homography is estimated for each of the two or more images. A homography is an invertible transformation from a real projective plane to a projective plane that maps straight lines to straight lines. A projective plane is a geometric construction that extends the concept of a plane such that, in one view, the ordinary plane is equipped with additional "points at infinity" where parallel lines intersect. Homographies are also known as collineation, projective transformation, and projectivity. Once camera rotation and translation information have been extracted from an estimated homography, which is often represented as a matrix, this information may be used to extract a latent image.

An estimated latent image is deconvolved for the two or more images. In mathematics and, in particular, functional analysis, convolution is a mathematical operation on two functions f and g, producing a third function that is typically viewed as a modified version of one of the original functions. Convolution is similar to cross-correlation. The convolution of f and g is written f*g, using an asterisk or star. It is defined as the integral of the product of the two functions after one is reversed and shifted. Deconvolution is an algorithm-based process used to reverse the effects of convolution on recorded data.

A point spread function is calculated for each of the two or more images. The point spread function (PSF) describes the response of an imaging system to a point source or point object. A more general term for the PSF is a system's impulse response, the PSF being the impulse response of a focused optical system. The PSF in many contexts can be thought of as the extended blob in an image that represents an unresolved object. Usually, such a point source contributes a small area of fuzziness to the final image. If this function can be determined, significant information can then be derived by computing the inverse or complementary function of the PSF, and convolving the acquired image with the complimentary function. The estimating, deconvolving, and calculating are repeated until the homography for each of the plurality of input images stabilizes.

As one skilled in the art will readily understand in light of having read the present disclosure, images captured by handheld cameras often suffer from motion blur due to camera shakes. Even cameras that are provided with a fixed mounting are frequently subject to shaking motion dues to seismic events, wind impact on a building, or other phenomena. Embodiments of the deblurring module discussed below remove the blurriness from image pairs to produce a latent (de-blurred) image, such that the resulting image or video frame appears more uniformly sharp. Embodiments described below are applicable to a range of image processing applications from the correction of images captured by handheld cameras to the processing of astronomical data. While the embodiments described below are explained with respect to images captured in the visible spectrum, one of skill in the art will readily realize that the techniques and process described herein are equally applicable to image data captured outside the visible electromagnetic spectrum (e.g., infra-red cameras, vibration-based imaging, radio telescope imaging, images of atomic particle radiation emission), without departing from the scope and intent of the embodiments herein described.

Embodiments provide an automatic procedure for removing camera shakes from multiple blurred images without requiring that the images are aligned. Unlike previous deblurring methods that require complicated and challenging alignment of blurred images in a pre-processing step, embodiments perform blind deblurring (i.e., recovery of the latent image from a set of "blurred" images in the presence of a poorly determined PSF) and blurred image alignment simultaneously to more accurately recover a deblurred image without first having to align images that may suffer distortion from different motions of the camera.

Example Embodiment

FIG. 1 illustrates a deblurring module that may implement one or more of the deblurring image editing techniques and tools explained with respect to FIGS. 2A-9B. Deblurring module 120 may, for example, implement one or more of deblurring image pairs and deblurring frame sequences from a video stream. FIG. 10 illustrates an example computer system on which embodiments of deblurring module 120 may be implemented. Deblurring module 120 receives as input a plurality (i.e., two or more) input images 110. Example images are shown in FIGS. 2A-2B and FIGS. 8A-8B. Deblurring module 120 may receive user input 112 activating a deblurring image editing tool. Deblurring module 120 then recovers a latent image or multiple latent images from the two or more input images 110, according to user input 112 received via user interface 122, using iterative estimates of homographies and point spread functions among input images 110, as well as iterative estimates of the latent image. Module 120 generates as output one or more output images 130, which are an estimate of the latent image shared by the two input images 110. Output image(s) 130 may, for example, be stored to a storage medium 140, such as system memory, a disk drive, DVD, CD, etc.

In some embodiments, deblurring module 120 may provide a user interface 122 via which a user may interact with the deblurring module 120, for example to activate a deblurring image editing tool. In some embodiments, the user interface may provide user interface elements whereby the user may select options including, but not limited to, deblurring individual images or whole video streams. In some embodiments, the user interface may provide user interface elements whereby the user may specify options such as pixel sampling and thresholds of homography change that indicate completion of a deblurring operation. In some embodiments, the user interface may provide user interface elements whereby the user may specify which layers data is to be sampled from and/or painted to.

Deblurring module 120 contains a delta function calculation module 150 for calculating a delta function ($K_i$) at the kernel center for each of input images 110. Example input images are discussed below with respect to FIGS. 2A-2B and FIGS. 8A-8B. A homography identification module 160 estimates an invertible transformation from a real projective plane to a projective plane that maps straight lines to straight lines for each of input images 110. A deconvolution module uses the estimated homographies to calculate a latent image from the set of input images 110. A PSF estimation module estimates a point spread function for the latent image and each of input images 110. Each of these modules is used iteratively until the homographies stabilize such that change in the homographies does not exceed a threshold. A frame generation module 180 then produces an output image 130 reflecting the latent image.

Figure 2C:
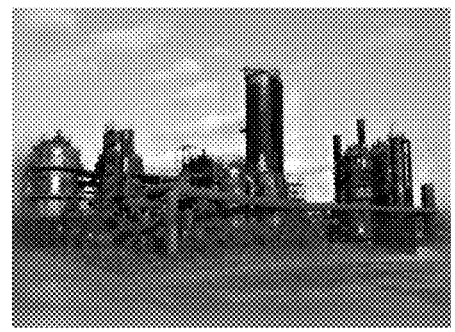
FIG. 2C illustrates a de-blurred frame resulting from deblurring of images according to some embodiments.
Figure 2A:
FIG. 2A illustrates a first blurred image usable to implement deblurring of images according to some embodiments.

FIG. 2A illustrates a first blurred image usable to implement deblurring of images according to some embodiments. First blurred image 200 is obscured by camera motion. Edges of objects appear visually indefinite and the blurring of first blurred image 200 generally distracts from the ability to absorb information from the image.

Figure 2B:
FIG. 2B depicts a second blurred frame usable to implement deblurring of images according to some embodiments.

FIG. 2B depicts a second blurred frame usable to implement deblurring of images according to some embodiments. Second blurred image 220 is obscured by camera motion. Edges of objects appear visually indefinite and the blurring of second blurred image 220 generally distracts from the ability to absorb information from the image.

FIG. 2C illustrates a de-blurred frame resulting from deblurring of images according to some embodiments. Deblured image 230 represents the latent image presented in first blurred image 200 and second blurred image 220, described above.

Figure 2D:
FIG. 2D illustrates a first point spread function usable to implement deblurring of images according to some embodiments.

FIG. 2D illustrates a first point spread function usable to implement deblurring of images according to some embodiments. A PSF for a first blurred image 200 is included as first estimated PSF 240.

Figure 2E:
FIG. 2E illustrates a second point spread function usable to implement deblurring of images according to some embodiments.

FIG. 2E illustrates a second point spread function usable to implement deblurring of images according to some embodiments. A PSF for a second blurred image 250 is included. As discussed above, the point spread function (PSF) describes the response of an imaging system to a point source or point object and may be thought of as representing the motion of a point during image capture.

Figure 3A:
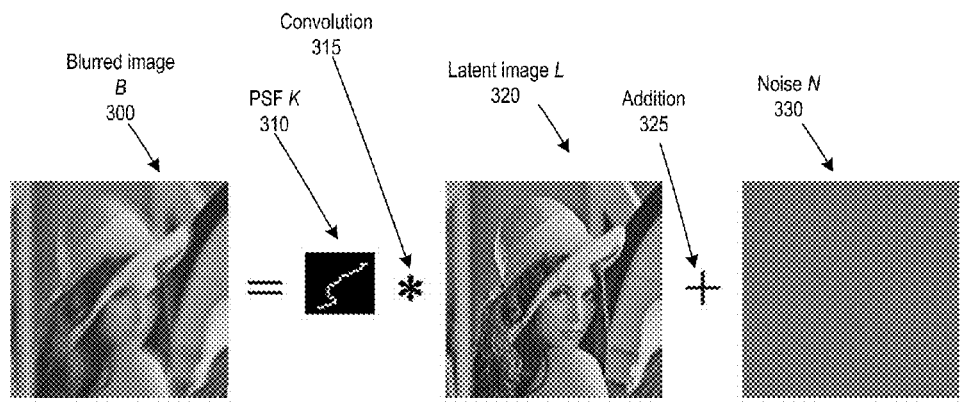
FIG. 3A depicts a convolutional blur model for a single image.

FIG. 3A depicts a convolutional blur model for a single image. The role of a point spread function, such as those depicted with respect to FIG. 2D-FIG. 2E above is more easily understood with respect to the convolution blur model illustrated in FIG. 3A.

A blurred image B 300 may be conceived of as a convolutional product (using the convolution operator 315) of a PSF K 310 convolved with sum (using addition operator 325) of a latent image L 320 and noise N 330. The convolution of f and g is written f*g, using an asterisk or star. It is defined as the integral of the product of the two functions after one is reversed and shifted. As such, it is a particular kind of integral transform:

$$(f * g)(x) = \int_{R^d} f(y)g(x-y)\,dy = \int_{R^d} f(x-y)g(y)\,dy.$$

This particular expression of the concept of convolution assumes that f and g are complex-valued functions on $R^d$. Noise N 330 is a random fluctuation inherent in recording the optical data of an image as an electrical signal, a characteristic of all electronic circuits. Noise generated by electronic devices varies greatly, as it can be produced by several different effects. Thermal and shot noise are considered difficult to avoid due to the laws of nature, rather than to the device exhibiting them, while other types depend mostly on manufacturing quality and semiconductor defects. Noise N 330 may be understood as an error or undesired random disturbance of auseful image information. Noise N is functionally a summation of unwanted or disturbing energy from natural and sometimes man-made sources, such that the convolution of a function h may be more usefully conceptualized as (f*g)+ $\epsilon$=h, where $\epsilon$ is noise that has entered the image.

Figure 3B:
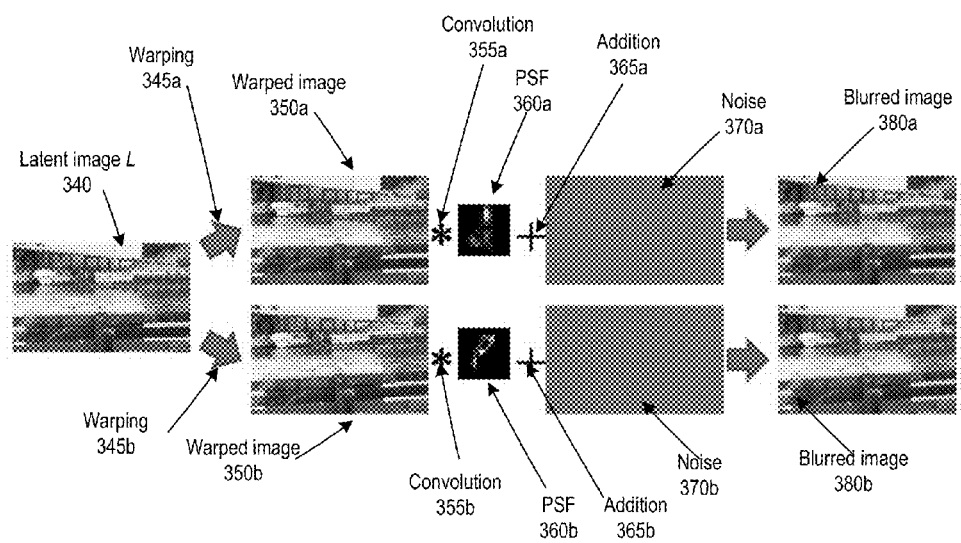
FIG. 3B illustrates a convolutional blur model for multiple images.

Embodiments apply the concept of deconvolution to a pair or more of images to extract a latent image or latent images. FIG. 3B illustrates a convolutional blur model for multiple images. A latent image L 340 is independently subjected to warpings 345a-345b before being captured as a pair of warped images 350a-350b. Warped images 350a-350b are then blurred as a result of camera motion, which may be modeled as convolutions 355a-355b with PSFs 360a-360b. Noise 370a-370b is also added (represented by addition operators 365a-365b) by the capture process to the result of the convolutions 355a-355b of warped images 350a-350b with PSFs 360a-360b to generate blurred images 380a-380b. As described below, embodiments seek to recover latent image L 340 from blurred images 380a-380b.

Deblurring Techniques

Figure 4:
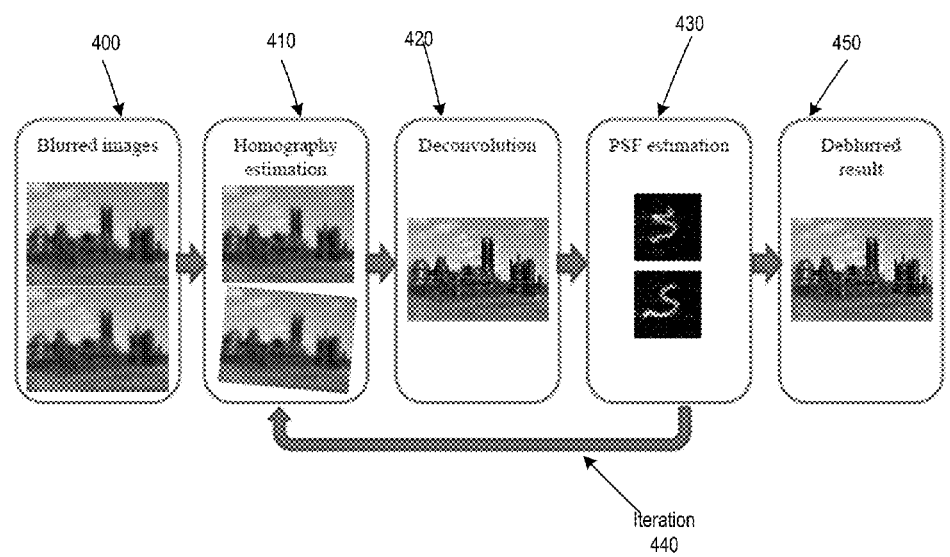
FIG. 4 is a high-level visual flowchart of iterative operations that may be performed in deblurring of images and intermediate products resulting from those operations according to some embodiments.

FIG. 4 is a high-level visual flowchart of iterative operations that may be performed in deblurring of images and intermediate products resulting from those operations according to some embodiments. Blurred images 400 are received as input. Homography estimation 410, described below, is performed with respect to blurred images 400. Deconvolution 420, followed by PSF estimation 430, is iteratively performed through a series of several iterations 440 until a deblurred result 450 is generated.

As described above, embodiments use a convolutional blur model, $B(x)=K*L(x)+N(x)$ (equation 1), where B is a blurred image, K is a motion blur kernel or a point spread function (PSF), L is a latent image that is recovered by the embodiment, N is unknown noise introduced during image acquisition, x is a 2-dimensional pixel position, and * is the convolution operator. With multiple blurred images $B_1, B_2, \ldots B_N$ of the same scene, motion blur can be modeled as $B_i=K_i*H_i(L)+N_i$ (equation 2), where i is the index of an image and $H_i$ is the homography transform for the i-th blurred image. Embodiments take multiple blurred images as input and estimate a single latent image result. Some embodiments employ an algorithm similar to:

---

Algorithm 1 Blind deblurring of unaligned multiple images procedure DEBLUR($B_1, B_2, \ldots, B_n$)
    L ← $B_1$
    $H_i$ ← Identity homography for each i
    $K_i$ ← delta function at the kernel center for each i
    for coarse to fine do
        for iter ← 1, max_iters do
            for i ← 1, n do
                $H_i$ ←EstimateHomographies(L, $B_i$, $K_i$, $H_i$)
            end for
            L ←Deconvolve($\{B_i\}, \{K_i\}, \{H_i\}$)
            for i ← 1, n do
                $K_i$ ←EstimatePSF(L, $B_i$, $H_i$)
            end for
        end for
    end for
end procedure

---

Such embodiments alternatingly estimate homographies, a latent image, and blur kernels to refine the estimates. Such embodiments perform the algorithm in a coarse to fine manner to estimate parameters more efficiently and to avoid local minima. Embodiments receive two blurred images, which are not aligned, and produce a deblurred result.

Figure 5:
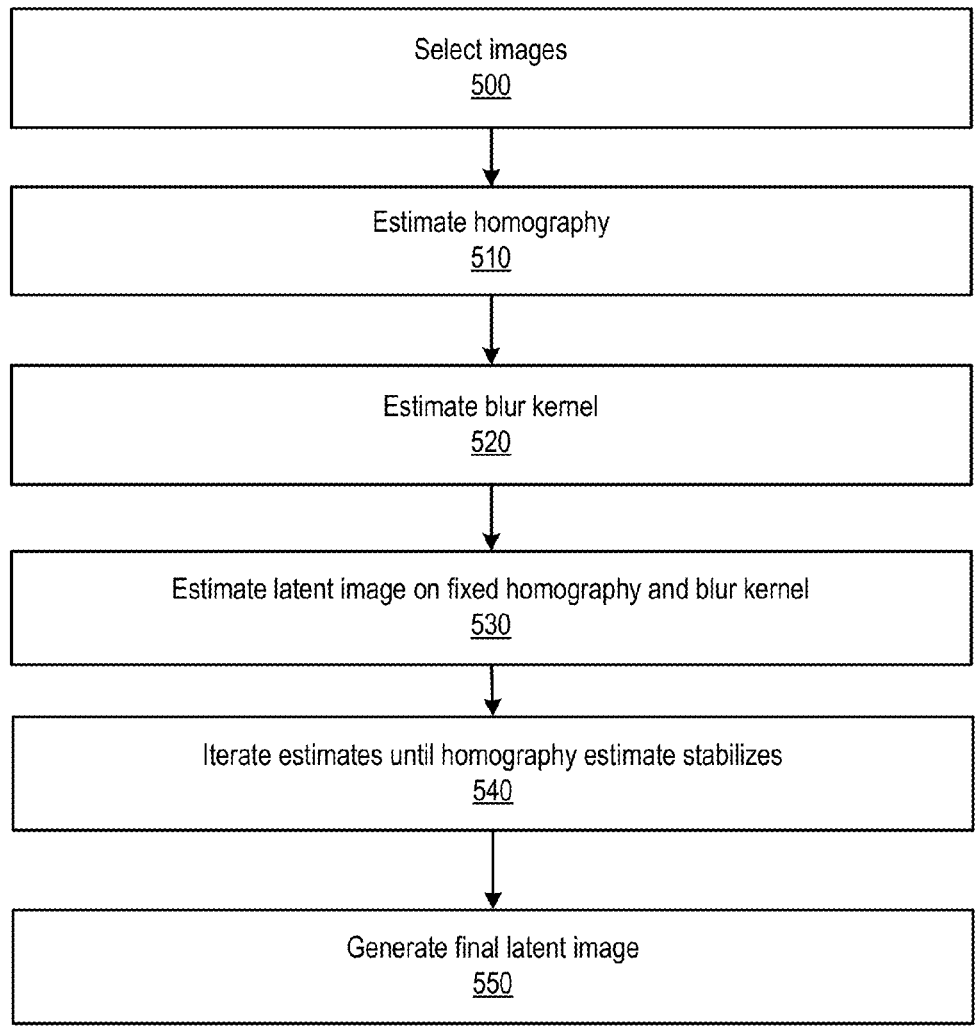
FIG. 5 is a high-level logical flowchart of a linear depiction of operations that may be performed in deblurring of images according to some embodiments.

FIG. 5 is a high-level logical flowchart of operations that may be performed in deblurring of images according to some embodiments. Images are selected (500). Homographies for the images are estimated (510), using methods that vary between embodiments.

A blur kernel or point spread function is estimated (520). While it has been observed that a maximum a posteriori approach does not work for blind deblurring, embodiments overcome this problem by using the prediction scheme of Sunghyun Cho and Seungyong Lee, described in *Fast-Motion Deblurring*. ACM Trans. Graphics, 28(5): article no. 145, 2009 and Bilateral filtering, as described in C. Tomasi and R. Manduchi. *Bilateral Filtering for Gray and Color Images*. In Proc. ICCV 1998, pages 839-846, 1998. Bilateral filtering is first applied to the current estimate of L and shock filtering is then applied. Then, embodiments compute gradient maps of L and threshold gradient values of low magnitudes. The result of the prediction is x- and y-directional gradient maps, which are denoted by $P_x$ and $P_y$, respectively. Embodiments estimate the blur kernel $K_i$ for each blurred image $B_i$ by optimizing $$E_{K_i}(k_i) = \|P_x^i k_i - D_x b_i\|^2 + \|P_y^i k_i - D_y b_i\|^2 + \lambda_{K\rho_K}(k_i), \quad (8)$$

where $k_i$ is a vector representation of $K_i$. $P_x^i$ is a matrix that represents a transformed gradient map $H_i$ ($P_x$). $P_y^i$ is defined similarly. $D_x$ and $D_y$ are matrix representations of x- and y-directional derivative operators, respectively. $\rho k$ is a regularization function, which is used for stabilizing the linear system. Embodiments use $\rho_k(k_i) = \|k_i\|^2$. $\lambda_K$ is a relative weight for the regularization term. Because eq. (8) is a quadratic function based on image gradients, it can be optimized very efficiently, as described in Sunghyun Cho and Seungyong Lee. Fast motion deblurring. ACM Trans. Graphics, 28(5): article no. 145, 2009.

A latent image is estimated based on a fixed homography and blur kernel estimate set (530). In this operation, embodiments update a latent image L while fixing $K_i$ and $H_i$. In order to perform the update to the latent image, embodiments optimize $$E_1(1) = \sum_i \|K_i H_i 1 - b_i\|^2 + \lambda_L \rho_L(1), \quad (6)$$

where $\rho_L$, is an image prior or a regularization function. Typically, embodiments use a hyper-Laplacian prior, i.e., $$\rho_L(1) = \sum_x |\partial_x L(x)|^\alpha + \sum_x |\partial_y L(x)|^\alpha, \quad (7)$$

where $\partial_x$ and $\partial_y$ are x- and y-directional derivative operators, respectively. Some embodiments typically set $\alpha=0:8$. $\lambda_L$ is a relative weight for the regularization term. Optimization of eq. (6) is performed by some embodiments using an iterative re-weighted least square method, as described in Anat Levin, Rob Fergus, Fredo Durand, and William T. Freeman. *Image and depth from a conventional camera with a coded aperture*. ACM Trans. Graphics, 26(3): article no. 70, 2007. The method of least squares is an approach to the approximate solution of overdetermined systems, i.e. sets of equations in which there are more equations than unknowns, where use of the phrase "least squares" denotes that the overall solution is calculated to minimize the sum of the squares of the errors made in solving every single equation. The method of iteratively reweighted least squares (IRLS) is used by some embodiments and solves objective functions of the form:

$$\mathop{\mathrm{argmin}}_\beta \sum_{i=1}^n w_i(\beta) |y_i - f_i(\beta)|^2,$$

by an iterative method in which each step involves solving a weighted least squares problem of the form:

$$\beta^{(t+1)} = \mathop{\mathrm{argmin}}_\beta \sum_{i=1}^n w_i(\beta^{(t)}) |y_i - f_i(\beta)|^2.$$

Estimates are iterated until the estimates stabilize (block 540). Blur kernels $K_i$ for each blurred image are updated while fixing $H_i$ and L. In this operation, embodiments also update homographies H, while fixing blur kernels $K_i$ and a latent image L. In a matrix form, equation (2) can be expressed for this step as $b_i = K_i H_i 1 + n_i$ (equation 3), where $b_i$, l, and $n_i$ are vector representations of $B_i$, L, $N_i$, and respectively. $K_i$ and $H_i$ are n×n matrices representing $K_i$ and $H_i$, respectively, where n is the number of pixels in L. To update homography $H_i$, embodiments estimate an update $H'_i$ by optimizing $$E_{H_i}(H'_i) = \|K_i H'_i H_i 1 - b_i\|^2. \quad (4)$$

To optimize $E_{H_i}$ efficiently, embodiments approximate it as $$E_{H_i}(H'_i) \approx \|H'_i K_i H_i 1 - b_i\|^2. \quad (5)$$

Although matrix multiplication is not commutative, $H'_i$ is very close to an identity matrix in the update process, and embodiments may safely use the approximation. Some embodiments minimize eq. (5) using a Lucas-Kanade based image registration method, details of which can be found at S. Baker and I. Matthews. *Lucas-kanade 20 years on: A unifying frame-work*. International Journal of Computer Vision (IJCV), 56(3):221-255, 2004. The Lucas-Kanade method is a widely used differential method for optical flow estimation developed by Bruce D. Lucas and Takeo Kanade, which assumes that the flow is essentially constant in a local neighborhood of the pixel under consideration, and solves the basic optical flow equations for all the pixels in that neighborhood by least squares criteria. In some embodiments, use of the Lucas-Kanade method assumes that the displacement of the image contents between two nearby instants (frames) is small and approximately constant within a neighborhood of the point p under consideration.

By combining information from several nearby pixels, embodiments use Lucas-Kanade based methods to resolve the inherent ambiguity of the optical flow equation with less sensitivity to image noise than is present in point-wise methods. After obtaining an $H'_i$, that minimizes eq. (5), embodiments update $H_i$ by multiplying $H'_i$, to the current $H_i$. Final latent images are then generated (block 550).

Figure 6:
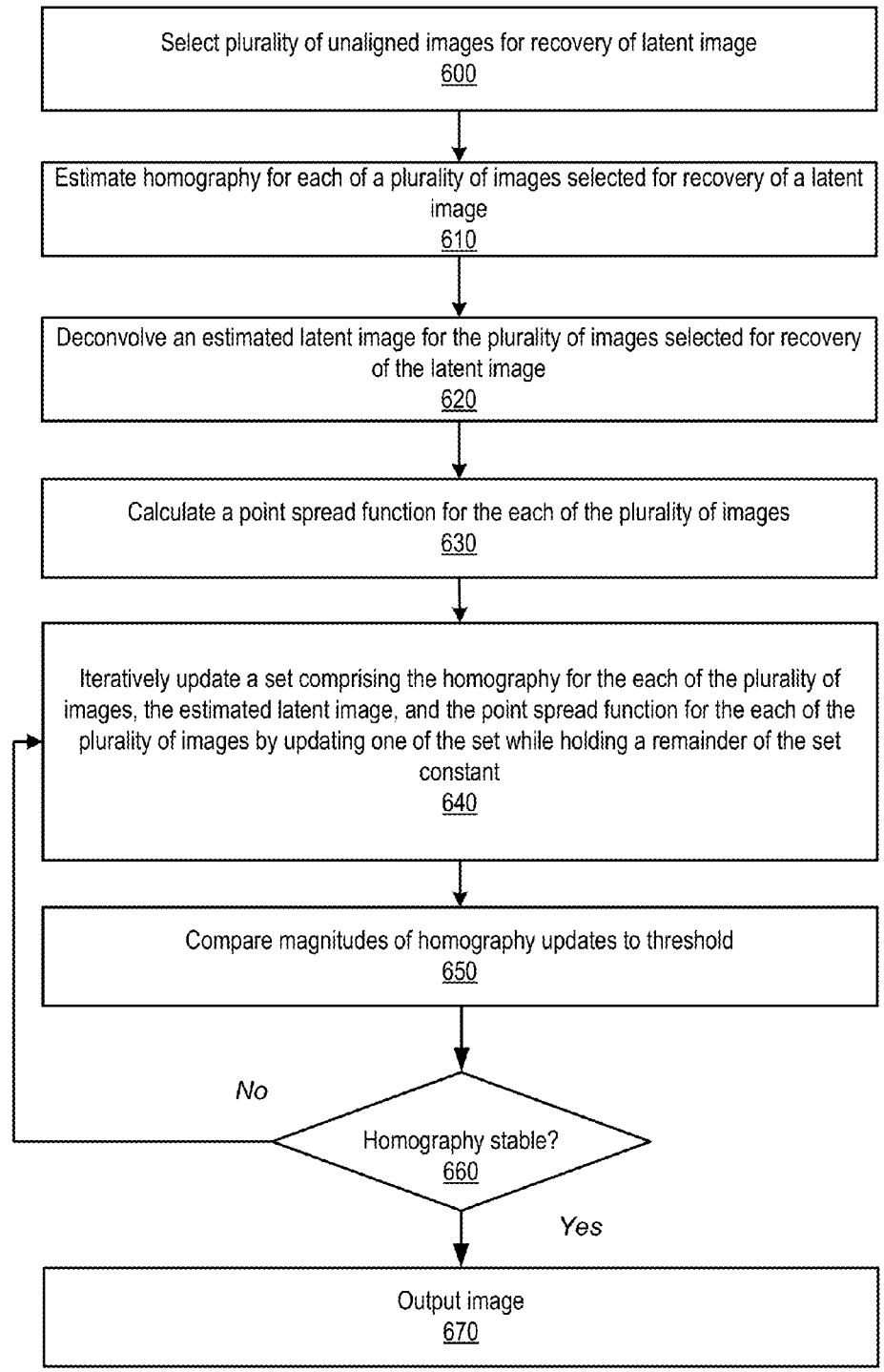
FIG. 6 is a high-level logical flowchart of operations that may be performed in deblurring of images with periodic threshold testing according to some embodiments.

FIG. 6 is a high-level logical flowchart of operations that may be performed in deblurring of images with periodic threshold testing according to some embodiments. A plurality of unaligned images is selected for recovery of a latent image (block 600). A homography is estimated for each of the plurality of images selected for recovery of the latent image (block 610).

An estimated latent image for the plurality of images selected for recovery of the latent image is deconvolved (block 620). A point spread function for the each of the plurality of images is calculated (block 630). A set comprising the homography for the each of the plurality of images, the estimated latent image, and the point spread function for the each of the plurality of images is iteratively updated by updating one of the set while holding a remainder of the set constant (block 640). The magnitudes of homography updates are compared to a threshold (block 650). A determination is made as to whether the homography is stable (block 660). If the homography is not stable, the process returns to block 640, which is described above. If the homography is stable, an image is provided as output. (block 670).

Figure 7:
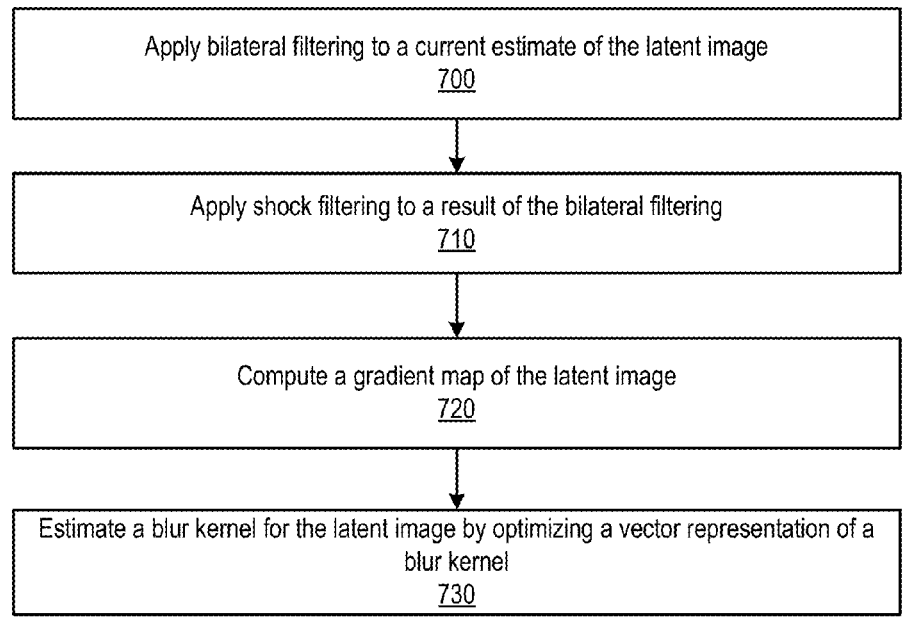
FIG. 7 is a high-level logical flowchart of operations that may be performed in the course of point spread function calculation for deblurring of images according to some embodiments.

FIG. 7 is a high-level logical flowchart of operations that may be performed in the course of point spread function calculation for deblurring of images according to some embodiments. Bilateral filtering is applied to a current estimate of the latent image (block 700). A bilateral filter is an edge-preserving and noise reducing smoothing filter. The intensity value at each pixel in an image is replaced by a weighted average of intensity values from nearby pixels. This weight is based off of a Gaussian distribution, such that the weights depend not only on Euclidean distance but also on the radiometric differences (differences in the range, e.g. color intensity), thereby preserving sharp edges by systematically looping through each pixel and according weights to the adjacent pixels accordingly.

Shock filtering is applied to a result of the bilateral filtering (block 710). Shock filters are based in the idea to apply locally either a dilation or an erosion process, depending on whether the pixel belongs to the influence zone of a maximum or a minimum. They create a sharp shock between two influence zones and produce piecewise constant segmentations. A gradient map of the latent image is computed (block 720). A blur kernel for the latent image is estimated by optimizing a vector representation of a blur kernel (block 730).

Figure 8A:
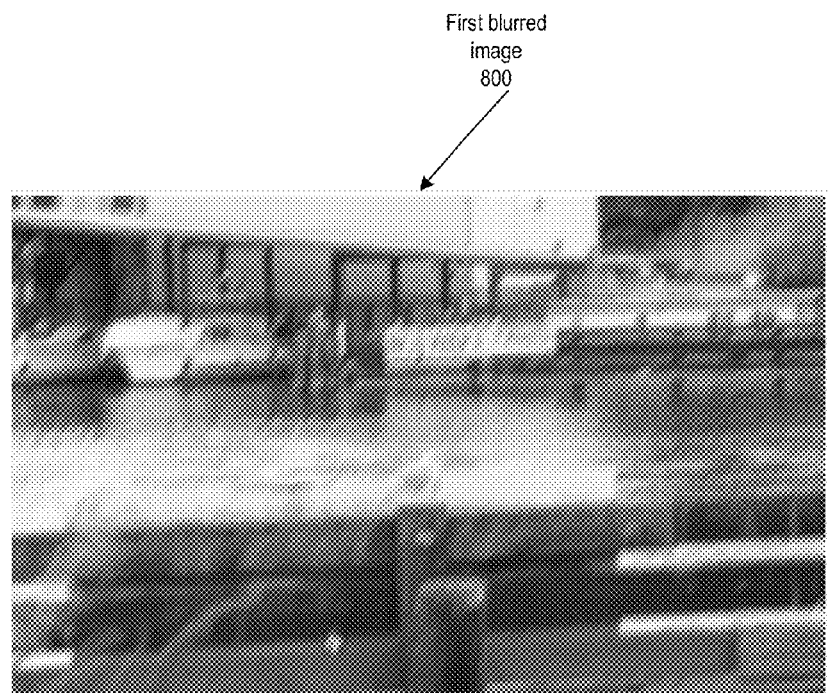
FIG. 8A illustrates a first blurred image usable to implement deblurring of images according to some embodiments.

FIG. 8A illustrates a first blurred image usable to implement deblurring of images according to some embodiments. A first blurred image 800 is provided. First blurred image 800 is obscured by camera motion. Edges of objects appear visually indefinite and the blurring of first blurred image 800 generally distracts from the ability to absorb information from the image.

Figure 8B:
FIG. 8B depicts a second blurred frame usable to implement deblurring of images according to some embodiments.

FIG. 8B depicts a second blurred frame usable to implement deblurring of images according to some embodiments. A second blurred image 810 is provided. Second blurred image 810 is obscured by camera motion. Edges of objects appear visually indefinite and the blurring of first blurred image 810 generally distracts from the ability to absorb information from the image.

Figure 9A:
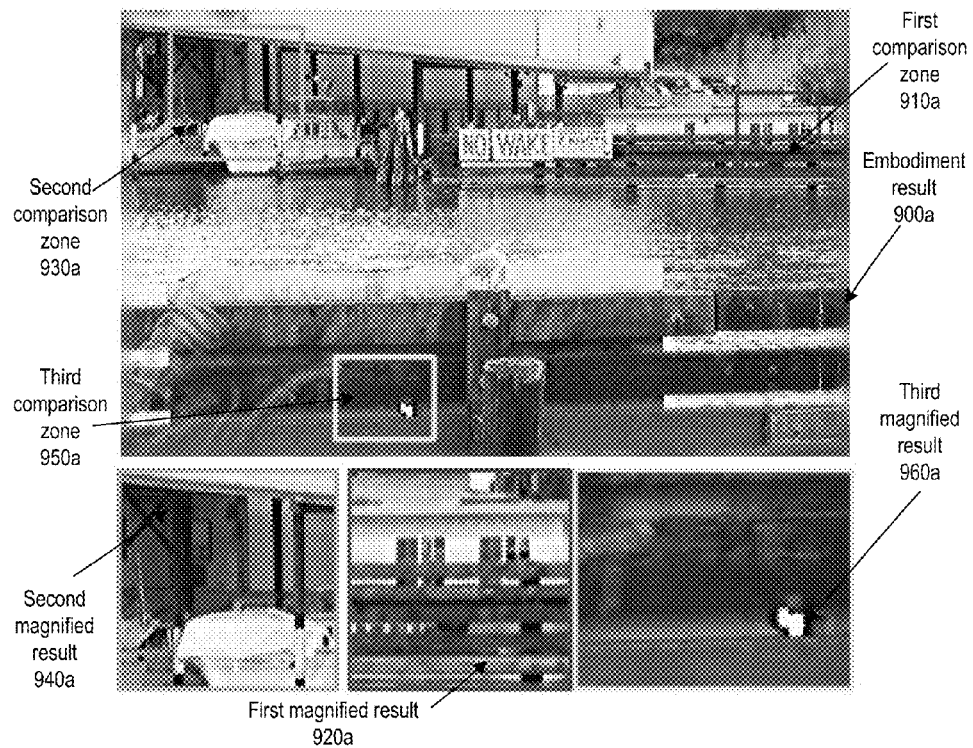
FIG. 9A illustrates a result deblurring of images according to some embodiments.
Figure 10:
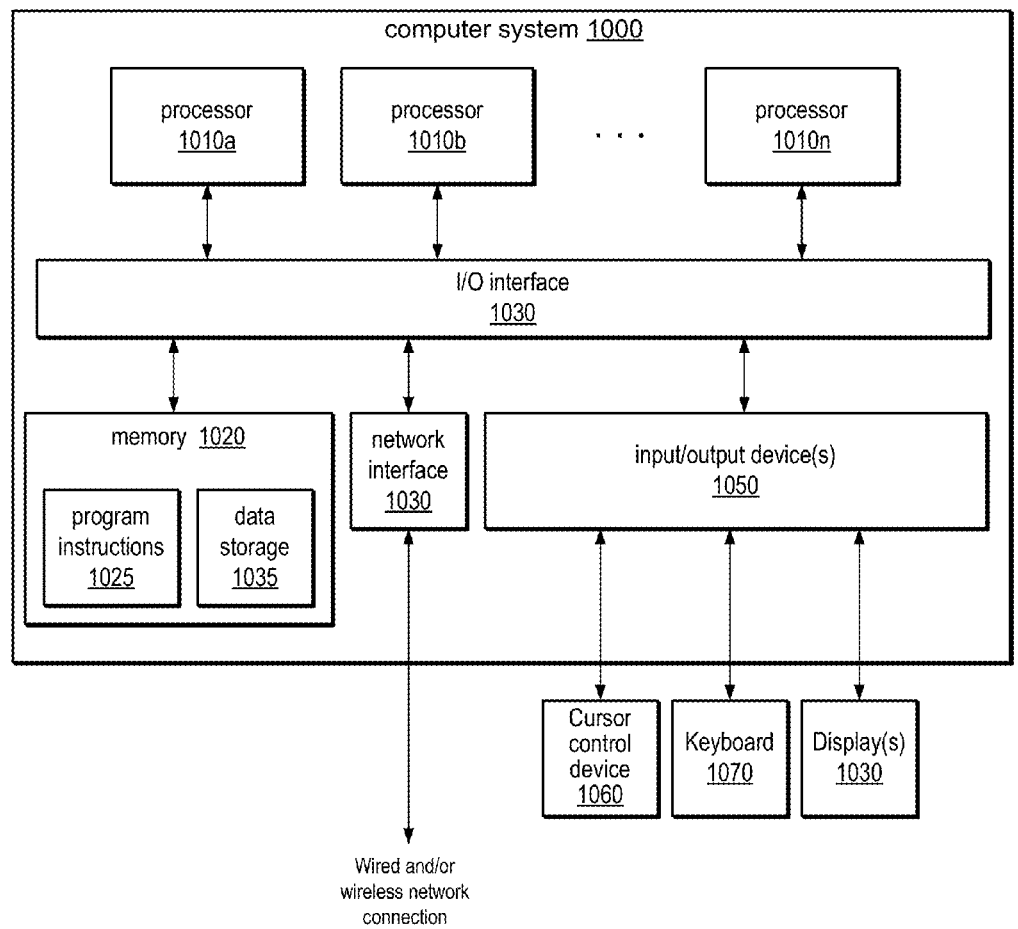
FIG. 10 illustrates an example computer system that may be used in embodiments.

FIG. 9A illustrates a result deblurring of images according to some embodiments. Embodiment result 900a represents the latent image presented in first blurred image 800 and second blurred image 810, described above. Embodiment result 900a reveals features that are generally visually sharper than those presented in first blurred image 800 and second blurred image 810. Additionally, within embodiment result 900a, three comparison zones are called out and magnified results are provided. First comparison zone 910a is magnified and reproduced as first magnified result 920a. Second comparison zone 930a is magnified and reproduced as second magnified result 940a. Third comparison zone 950a is magnified and reproduced as first magnified result 960a.

Figure 9B:
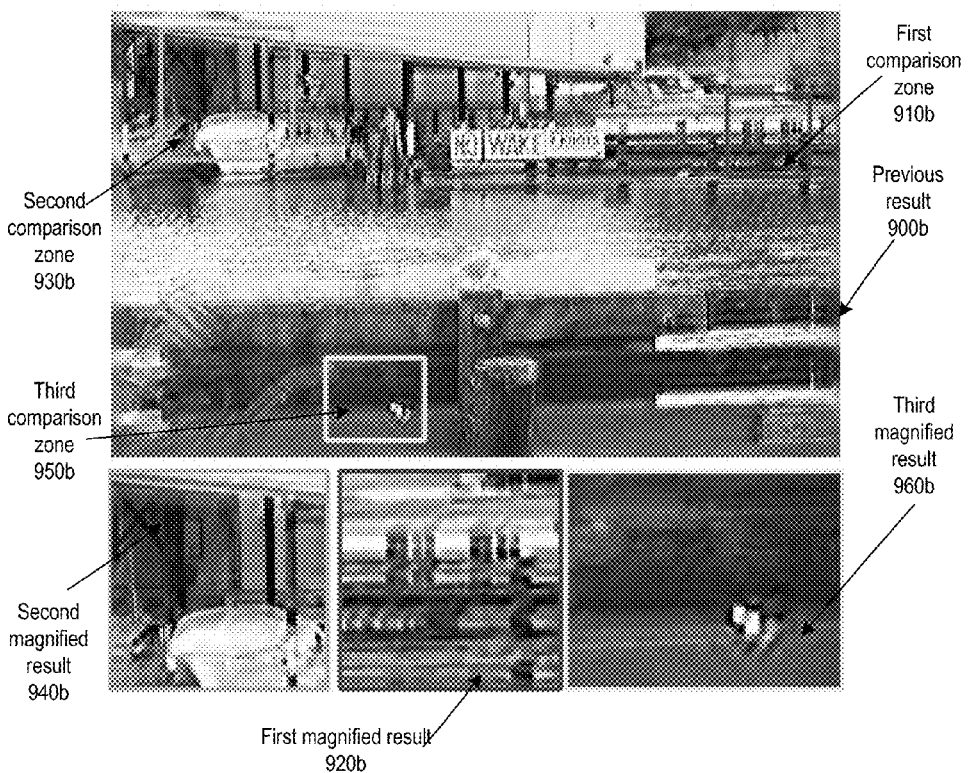
FIG. 9B depicts a result of deblurring of images according to previous methods for comparison to the results of some embodiments.

FIG. 9B depicts a result of deblurring of images according to previous methods for comparison to the results of some embodiments. Previous result 900b represents the latent image presented in first blurred image 800 and second blurred image 810, described above, but previous result 900b is a result of previous techniques for deblurring, and is provided purely to illustrate the degree to which the embodiments described herein produce results superior to any previously available techniques. Previous result 900b reveals features that are generally less visually sharp than those presented in first embodiment result 900a. Additionally, within previous result 900b, three comparison zones are called out and magnified results are provided.

First comparison zone 910b is magnified and reproduced as first magnified result 920b. First magnified result 920b is noteworthy in that vertical lines present in first magnified result 920a (using the embodiments herein described) are presented as wavy blurs in first magnified result 920b (using previously available techniques). With regard to the ability to exhibit fidelity to the vertical lines presented in first comparison zone 910a and first comparison zone 910b, the embodiments described above generate clearly superior results (shown in first magnified result 920a).

Second comparison zone 930b is magnified and reproduced as second magnified result 940b. Second magnified result 940b is noteworthy in that horizontal lines present on the bow of the boat in second magnified result 940a (using the embodiments herein described) are nearly completely obscured in second magnified result 940b (using previously available techniques). With regard to the ability to exhibit fidelity to the horizontal lines presented in second comparison zone 930a and second comparison zone 930b, the embodiments described above generate clearly superior results (shown in second magnified result 940a).

Third comparison zone 950b is magnified and reproduced as third magnified result 960b. Third magnified result 960b is noteworthy in that crisp horizontal lines present in third magnified result 960a (using the embodiments herein described)

are subject to significant jitter in third magnified result 960b (using previously available techniques). With regard to the ability to exhibit fidelity to the horizontal lines presented in third comparison zone 950a and third comparison zone 950b, the embodiments described above generate clearly superior results (shown in third magnified result 960a).

Example System

Embodiments of a deblurring module and/or of the deblurring image editing techniques as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a deblurring image editing module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a deblurring image editing module as described herein, and data storage 1035, comprising various data accessible by program instructions 1025. In one embodiment, program instructions 1025 may include software elements of embodiments of a deblurring image editing module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a deblurring image editing module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    estimating a respective homography for each of a plurality of images selected for recovery of a latent image of the plurality of images, wherein two or more images of the plurality are unaligned;
    deconvolving an estimated latent image for the plurality of images selected for recovery of the latent image;
    calculating a respective point spread function for each of the plurality of images;
    iteratively updating a set comprising a plurality of members, wherein the plurality of members comprise the respective homography for each of the plurality of images, the estimated latent image, and the respective point spread function for each of the plurality of images, wherein the iteratively updating comprises updating one of the plurality of members while holding a remainder of the plurality of members of the set constant, and
    the iteratively updating is performed until the respective homography for each of the plurality of images stabilizes.

2. The computer-implemented method of claim 1, wherein the calculating the point spread function further comprises estimating a point spread function based on a static homography assumption.

3. The computer-implemented method of claim 1, wherein the updating the homography further comprises:
    calculating a homography update using a fixed blur kernel and a fixed estimate of the latent image, and
    multiplying the homography by the homography update.

4. The computer-implemented method of claim 3, wherein the calculating the homography update further comprises minimizing an energy function of the homography update using an image registration method.

5. The computer-implemented method of claim 3, further comprising calculating a magnitude of a homography update by subtracting the homography from the product of the homography and the homography update.

6. The computer-implemented method of claim 1, wherein the updating the latent image further comprises optimizing an energy function of a latent image while fixing the blur kernel and the homography.

7. The computer-implemented method of claim 6, wherein the optimizing the energy function further comprises optimizing the energy function using a hyper-laplacian image prior.

8. A non-transitory computer-readable storage medium storing program instructions, wherein the program instructions are computer-executable to implement:
  estimating a respective homography for each of a plurality of images selected for recovery of a latent image of the plurality of images, wherein two or more images of the plurality are unaligned;
  deconvolving an estimated latent image for the plurality of images selected for recovery of the latent image;
  calculating a respective point spread function for each of the plurality of images;
  iteratively updating a set comprising a plurality of members, wherein the plurality of members comprise the respective homography for each of the plurality of images, the estimated latent image, and the respective point spread function for each of the plurality of images, wherein the iteratively updating comprises updating one of the plurality of members while holding a remainder the plurality of members of the set constant, and
    the iteratively updating is performed until the respective homography for each of the plurality of images stabilizes.

9. The non-transitory computer-readable storage medium of claim 8, wherein the program instructions computer-executable to implement the calculating the point spread function further comprise program instructions computer-executable to implement estimating a point spread function based on a static homography assumption.

10. The non-transitory computer-readable storage medium of claim 8, wherein the program instructions computer-executable to implement the updating the homography further comprise program instructions computer-executable to implement:
  calculating a homography update using a fixed blur kernel and a fixed estimate of the latent image, and
  multiplying the homography by the homography update.

11. The non-transitory computer-readable storage medium of claim 10, wherein the program instructions computer-executable to implement the calculating the homography update further comprise program instructions computer-executable to implement minimizing an energy function of the homography update using an image registration method.

12. The non-transitory computer-readable storage medium of claim 10, further comprising instructions computer-executable to implement calculating a magnitude of a homography update by subtracting the homography from the product of the homography and the homography update.

13. The non-transitory computer-readable storage medium of claim 8, wherein the program instructions computer-executable to implement updating the latent image further comprise program instructions computer-executable to implement optimizing an energy function of a latent image while fixing the blur kernel and the homography.

14. The non-transitory computer-readable storage medium of claim 13, wherein the program instructions computer-executable to implement the optimizing the energy function further comprise program instructions computer-executable to implement optimizing the energy function using a hyper-laplacian image prior.

15. A system, comprising:
  at least one processor; and
  a memory comprising program instructions, wherein the program instructions are executable by the at least one processor to:
    estimate a respective homography for each of a plurality of images selected for recovery of a latent image of the plurality of images, wherein two or more images of the plurality are unaligned;
    deconvolve an estimated latent image for the plurality of images selected for recovery of the latent image;
    calculate a respective point spread function for each of the plurality of images;
    iteratively update a set comprising a plurality of members, wherein the plurality of members comprise the respective homography for each of the plurality of images, the estimated latent image, and the respective point spread function for each of the plurality of images, wherein
      the program instructions executable by the at least one processor to iteratively update further comprise program instructions executable by the at least one processor to update one of a the plurality of members while holding a remainder of the plurality of members of the set constant, and
      the program instructions executable by the at least one processor to iteratively update further comprise program instructions executable by the at least one processor iteratively update until the respective homography for each of the plurality of images stabilizes.

16. The system of claim 15, wherein the program instructions executable by the at least one processor to implement the calculating the point spread function further comprise program instructions executable by the at least one processor to estimate a point spread function based on a static homography assumption.

17. The system of claim 15, wherein the program instructions executable by the at least one processor to update the homography further comprise program instructions executable by the at least one processor to:
  calculate a homography update using a fixed blur kernel and a fixed estimate of the latent image, and
  multiply the homography by the homography update.

18. The system of claim 17, wherein the program instructions executable by the at least one processor to calculate the homography update further comprise program instructions executable by the at least one processor to minimize an energy function of the homography update using an image registration method.

19. The system of claim 17, further comprising program instructions executable by the at least one processor to calculate a magnitude of a homography update by subtracting the homography from the product of the homography and the homography update.

20. The system of claim 15, wherein the program instructions executable by the at least one processor to update the latent image further comprise program instructions executable by the at least one processor to optimize an energy function of a latent image while fixing the blur kernel and the homography.

* * * * *

UNITED STATES PATENT AND TRADEMARK OFFICE
CERTIFICATE OF CORRECTION

PATENT NO.       : 8,411,980 B1  
APPLICATION NO.  : 13/034461  
DATED            : April 2, 2013  
INVENTOR(S)      : Jue Wang et al.

Page 1 of 1

It is certified that error appears in the above-identified patent and that said Letters Patent is hereby corrected as shown below:

Title Page: Item 57

ABSTRACT, Line 6, delete "the", between "...spread function for" and "each of...", therefor.

ABSTRACT, Line 7, delete "the", after "The homography for", therefor.

ABSTRACT, Line 9, delete "the", between "...spread function for" and "each of the...", therefor.

ABSTRACT, Line 12, delete "the", between "...the homography for" and "each of...", therefor.

ABSTRACT, Line 14, delete "the", between "...spread function for" and "each of the...", therefor.

Signed and Sealed this  
Twenty-ninth Day of October, 2013

Teresa Stanek Rea  
*Deputy Director of the United States Patent and Trademark Office*